United States Patent
Underwood et al.

(10) Patent No.: US 7,230,468 B2
(45) Date of Patent: Jun. 12, 2007

(54) SYSTEMS AND METHODS FOR PROVIDING DISTRIBUTED CONTROL SIGNAL REDUNDANCY AMONG ELECTRONIC CIRCUITS

(75) Inventors: Brad Underwood, Plano, TX (US); Stuart C. Haden, Lucas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 91 days.

(21) Appl. No.: 10/797,776

(22) Filed: Mar. 10, 2004

(65) Prior Publication Data

US 2005/0200394 A1    Sep. 15, 2005

(51) Int. Cl.
*H03K 3/13* (2006.01)

(52) U.S. Cl. .................. 327/292; 327/298; 327/407; 327/526

(58) Field of Classification Search ........ 327/292–298, 327/407, 526, 99
See application file for complete search history.

(56) References Cited

U.S. PATENT DOCUMENTS

| | | | | |
|---|---|---|---|---|
| 3,751,685 A | * | 8/1973 | Jaeger | 326/10 |
| 5,065,454 A | * | 11/1991 | Binz et al. | 398/154 |
| 5,249,206 A | * | 9/1993 | Appelbaum et al. | 375/356 |
| 5,422,915 A | * | 6/1995 | Byers et al. | 375/357 |
| 5,642,069 A | * | 6/1997 | Waite | 327/292 |
| 5,886,557 A | * | 3/1999 | Wilcox | 327/292 |
| 6,194,969 B1 | * | 2/2001 | Doblar | 331/2 |
| 6,310,895 B1 | * | 10/2001 | Lundh et al. | 370/503 |
| 6,516,422 B1 | * | 2/2003 | Doblar et al. | 713/503 |

* cited by examiner

*Primary Examiner*—Timothy P. Callahan
*Assistant Examiner*—An T. Luu

(57) ABSTRACT

In one embodiment, a distributed redundant control signal distribution system comprises a first control signal source co-located with a first set of control signal controlled circuit elements, at least one second control signal source co-located with a second set of control signal controlled circuit elements, at least one controller for providing control signals from the first control signal source to control both the first and second sets of controlled circuit elements, the controller operable for substituting signals from the second control signal source for signals from the first signal control source if the signals from the first control signal source become unavailable to either the first or second circuit elements.

27 Claims, 4 Drawing Sheets

SYSTEMS AND METHODS FOR PROVIDING DISTRIBUTED CONTROL SIGNAL REDUNDANCY AMONG ELECTRONIC CIRCUITS

FIELD OF THE INVENTION

This invention relates to the provision of inter-circuit control signals and more particularly to systems and methods for providing distributed control signal redundancy among electronic circuits.

DESCRIPTION OF RELATED ART

In multiple-circuit electronic systems it is often necessary to send control signals, such as, for example, clock signals, to control system timing among the various physically separated circuits. These circuits are usually contained on separate electronic boards all in electronic communication. In many situations, it is desirable that timing signals from a single clock control the circuitry on all of the boards. This, then, argues for a single clock source positioned physically on one of the boards (the clock-control board) with these signals then interconnected, by a signal transmission system, such as a cable, to all of the other boards.

For reliability, it has become common practice to provide dual redundancy for these clock signals. Thus, two clocks are typically provided on the clock control board and two cables are provided among the boards. Thus, if a clock fails, a second clock is available to provide the timing signals. If one of the signal transmission cables fails, then the other transmission cable distributes the clock signals from the clock board.

However, if the power to the clock board fails (a single failure) both clocks on that board fail causing, in effect, a dual failure. Thus, a single failure effectively brings down the entire system. Also, when one of the clocks fails, the system is thereafter vulnerable to a single clock failure until the failed clock is replaced. Replacing the failed clock without removing the clock board, or at least without removing the power to the clock board, is not usually possible.

BRIEF SUMMARY OF THE INVENTION

In one embodiment, a distributed redundant control signal distribution system comprises a first control signal source co-located with a first set of control signal controlled circuit elements, at least one second control signal source co-located with a second set of control signal controlled circuit elements, at least one controller for providing control signals from the first control signal source to control both the first and second sets of controlled circuit elements, the controller operable for substituting signals from the second control signal source for signals from the first signal control source if the signals from the first control signal source become unavailable to either the first or second circuit elements.

DETAILED DESCRIPTION

Figure 1:
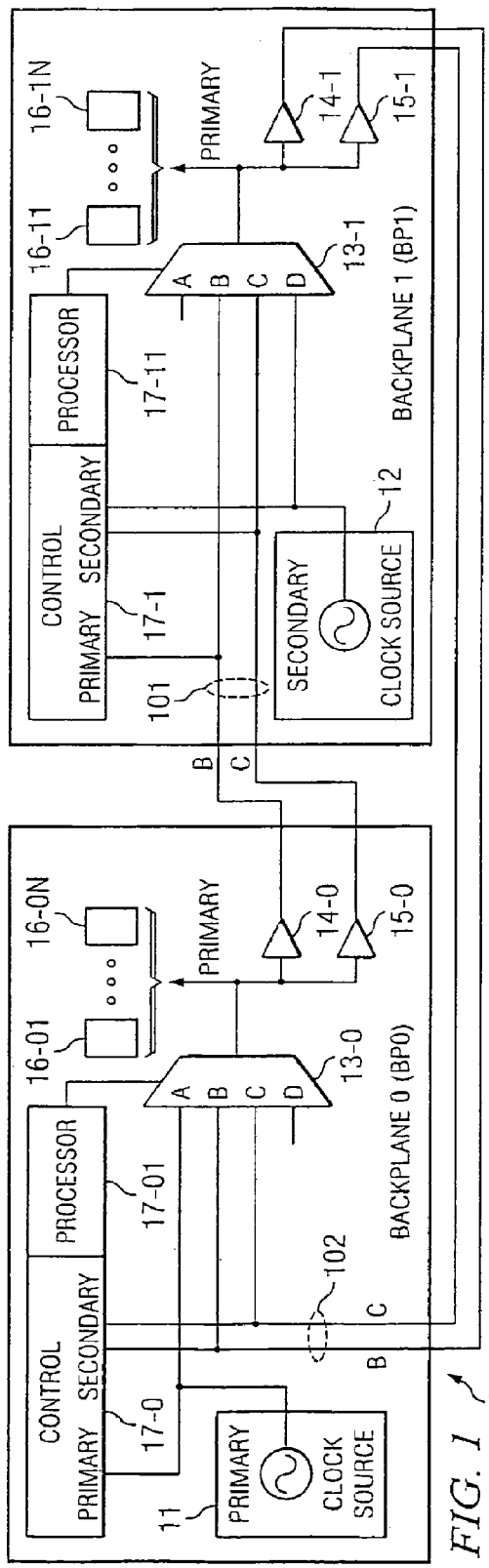
FIG. 1 shows one embodiment of a dual backplane system having redundant control signals.

Referring now to FIG. 1, system 10 is one embodiment of a dual backplane or system having multiple control signal sources. In the embodiment shown, the control signals are from primary clock source 11 and secondary clock source 12. The secondary clock source is on a board (or backplane) different from the primary clock source. Backplane 0 (BPO) has four input multiplexer 13-0 that operates under control of control circuit 17-0 to switch one of the inputs A, B, C, D to the output of mux 13-0 following an established procedure as will be discussed. The clock output from mux 13-0 is provided to circuitry 16-01 to 16-0N co-located on backplane BPO. The same clock output of mux 13-0 is provided via amplifiers 14-0 and 15-0 over dual cable 101 to the inputs B and C of mux 13-1 located on backplane 1 (BP1).

Note that the transmission path may be cables or could be wireless, microwave, etc. Backplane BP1 is constructed almost exactly as is backplane BP0, except that secondary clock source 12 is connected to the D input of mux 13-1 instead of to the A input as was primary clock source 11 in backplane BP0. Control 17-0 (and control 17-1) receive primary and secondary clock signals as shown. Since there is no A input to mux 13-1, the B input from cable 101 is switched to the mux output and to control signal controlled circuits 16-11 to 16-1N. These same signals (the primary clock signal from board BP0) is fed back via cable 102 to the B and C inputs to mux 13-0. This has no effect on the system, since mux 13-0, under control of control 17-0 continues to have the A input (primary signal source) switched to the output of mux 13-0.

Figure 6:
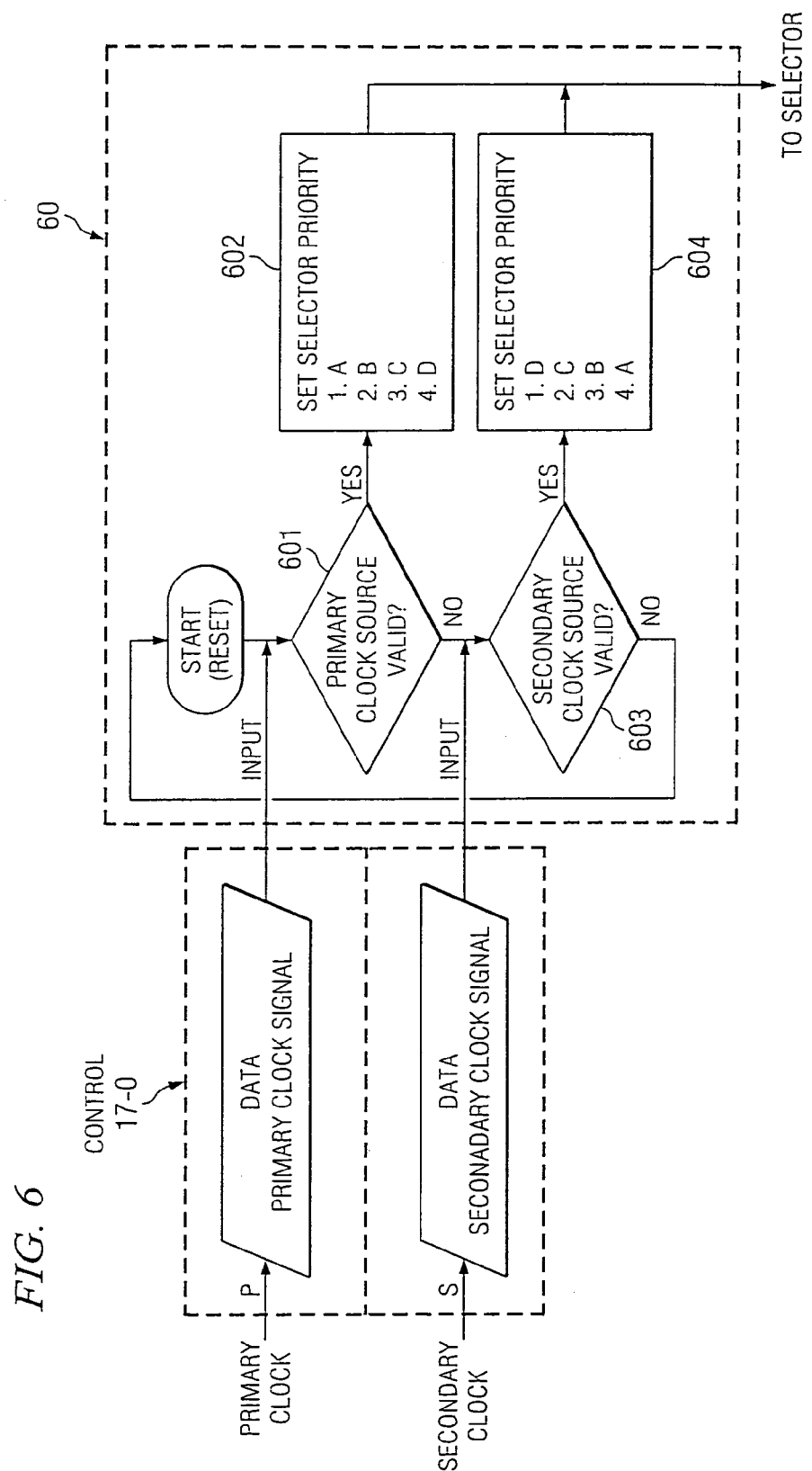
FIG. 6 shows a flow chart of one embodiment for selecting the proper control signal.

One embodiment 60 utilized by processors 17-01 and 17-11 in control circuits 17-0 and 17-1 for controlling mux 13-0 and 13-1 is shown in FIG. 6. Essentially mux 13-0 takes the inputs in hierarchical order A, B, C and D such that if a signal is present on input A then the A input will be provided to the mux output. Absent a signal on input A, the mux looks for signals on B, C and D in that hierarchical order. As shown in FIG. 6, this operation is controlled by process 601, such that so long as a valid signal is received from the primary clock source, the mux is controlled by process 602 to follow the hierarchical order A, B, C and D. This procedure is followed in all backplanes (boards) having a clock source.

If the primary clock source fails (or is not valid) then process 603 determines if the secondary clock source is valid. If the secondary clock source is valid, then the hierarchical order is D, C, B, A. Again, this procedure is followed in all backplanes (boards) having a clock.

Figure 2:
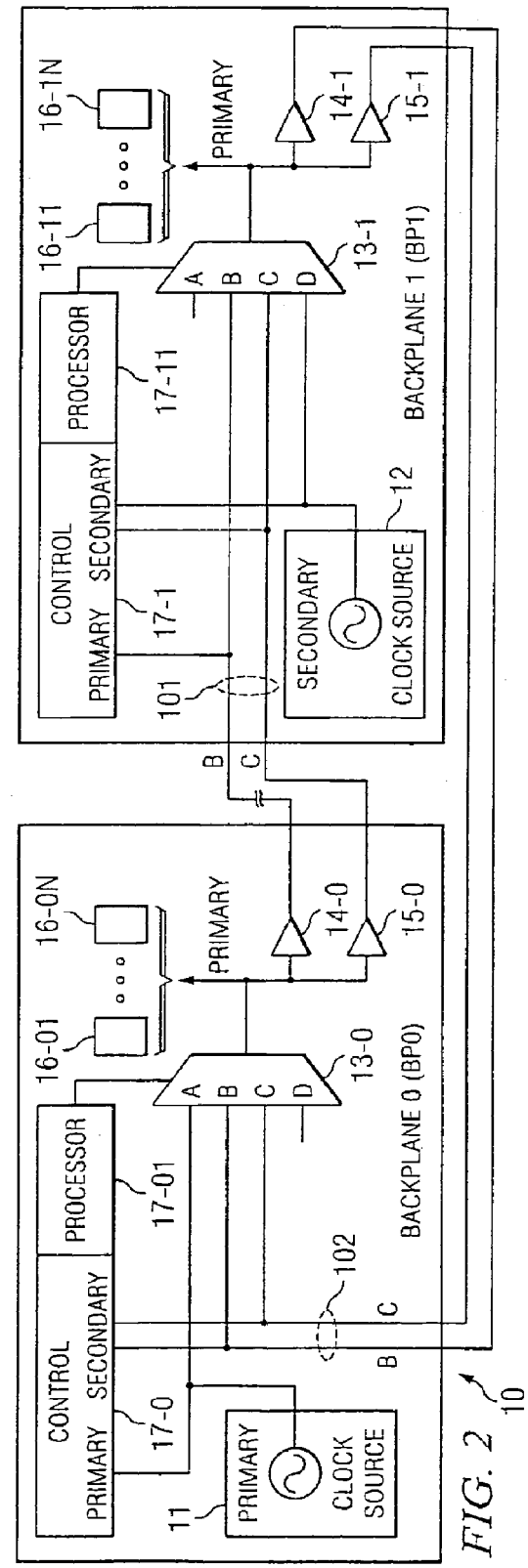
FIGS. 2, 3 and 4 show the embodiment of FIG. 1 in various failure modes.

Turning now to FIG. 2, and assuming that a default occurs on the B portion of transmission path 101. When that occurs, there is no signal on the B input of mux 13-1. Mux 13-1 then switches to its C input. Since the C input also contains signals from primary clocks source 11 the output of mux 13-1 continues to provide control of the circuit elements on backplane BP1 from the primary clock source on board BP0.

Figure 3:
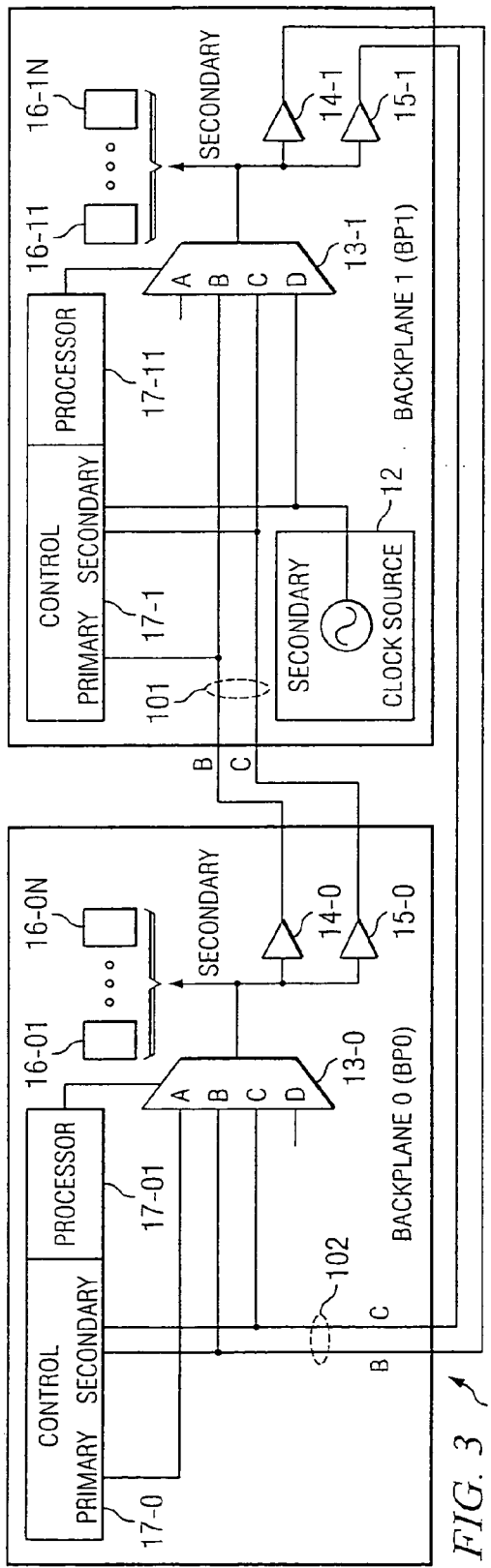

As shown in FIG. 3, in the event that primary clock source 11 were to fail, then the signal from primary clock source 11 is removed from the output of mux 13-0 and thus removed from both paths of transmission paths 101 and also from the B and C inputs of mux 13-1. In this situation, signals from secondary clock source 12 are switched from the D input of mux 13-1 to its output. Accordingly, the signals from secondary clock source 12 drives the circuits co-located on backplane BP1. This signal is provided to amplifiers 14-1 and 15-1 and over transmission path 102 to the B and C inputs of mux 13-0. Mux 13-0 then switches the secondary clock signals to its output to control the circuits on board BP0.

As discussed above, and as shown on FIG. 6, since the primary clock signals are not valid, both mux 13-0 and 13-1 switch to the D, C, B, A hierarchy. This has no effect on board BP0, but on the board BP1 it has the effect of preventing an unstable condition as mux 13-1 otherwise would switch back and forth between input D and B. This would occur because the secondary clock signal is fed back over transmission path 101 and would appear on the B and C inputs of mux 13-1. Thus, unless process 60, or a similar process were to be used, the signal on the B (or C) input of mux 13-1 would cause the mux to switch to the signal on the B (or C) input. If this were to occur, then the signal from clock source 12 (on input D) would cease to be the output of mux 13-1 and the system could go into oscillation.

Figure 4:
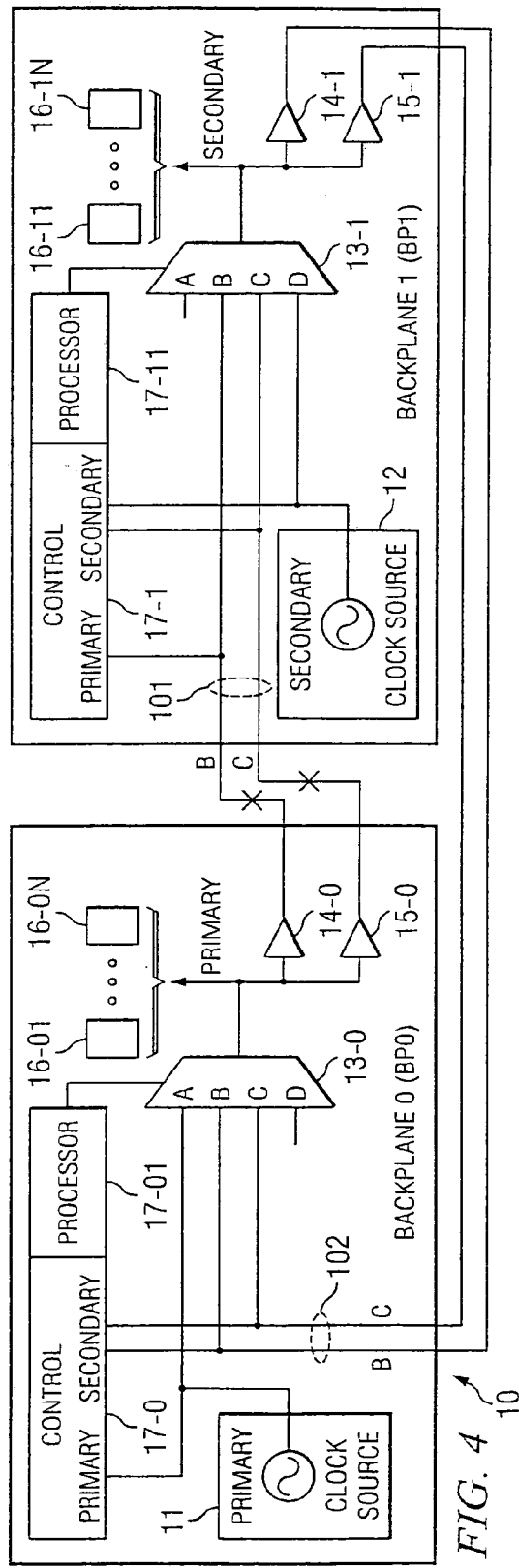

Turning now to FIG. 4, if both paths of transmission path 101 are faulted then this would be a double fault condition and since the system is designed to protect against single faults, the system would go into asynchronous operation with secondary clock source 12 driving the elements co-located on backplane BP1 and primary clock source 11 driving the circuit elements co-located therewith on backplane BP0.

The system could be designed having more paths interconnecting the various backplanes (and move mux inputs) thereby providing higher redundancy levels if desired.

Figure 5:
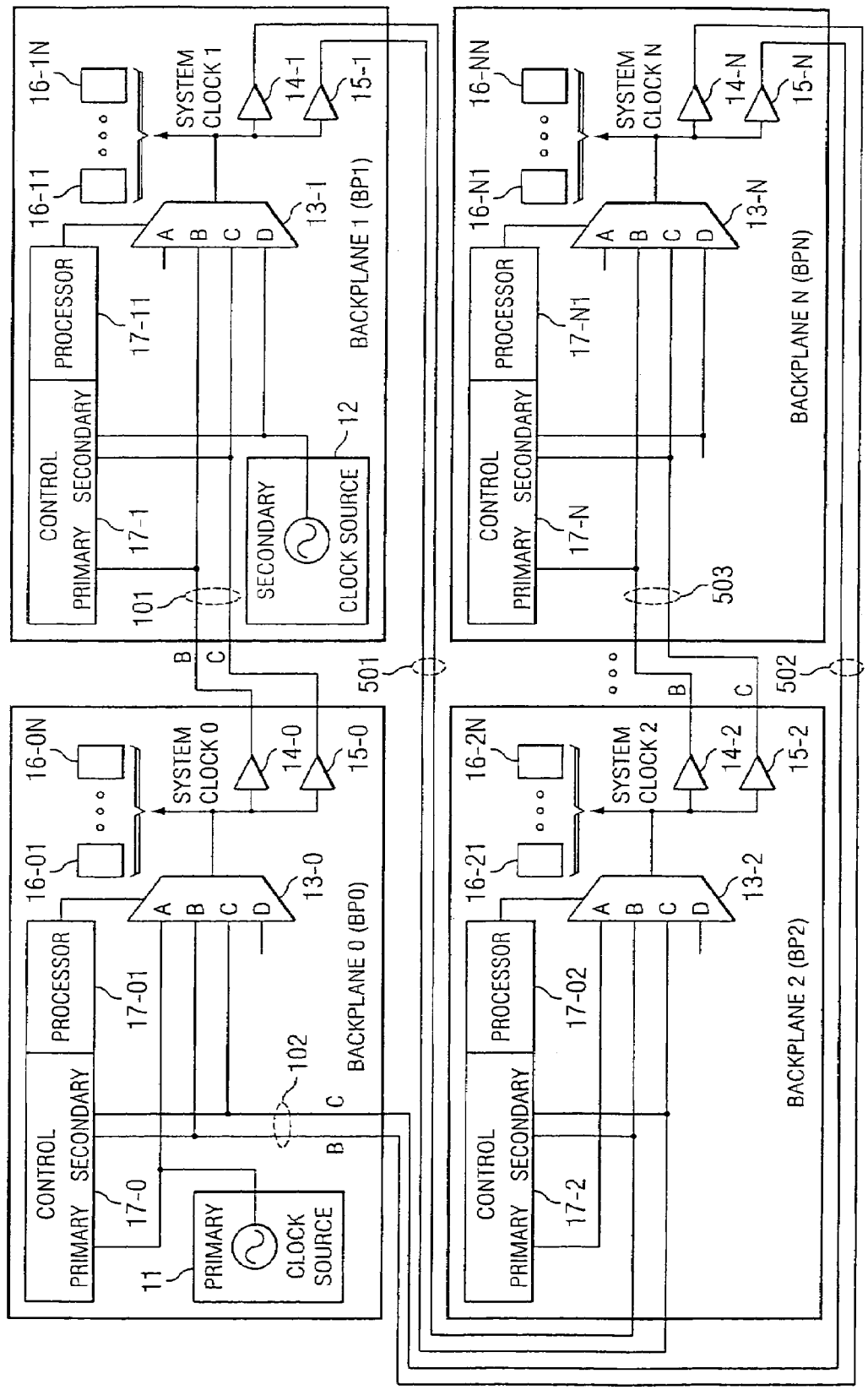
FIG. 5 shows an embodiment of a system having multiple backplanes with two separate control signal sources.

Turning now to FIG. 5, there is shown an embodiment 50 of a multi backplane system having two clock sources and several backplanes, such as backplanes BP0 through BPN. The embodiment shown in system 50 works the same as discussed with respect to the embodiment shown in FIG. 1, except that, backplanes BP2 through BPN do not have clocks local thereto. Although, the system could have as many clocks as desired. In the embodiment shown, backplanes BP2 through BPN will have the same clock as all the other boards via cables 501 and 503.

What is claimed is:

1. A distributed redundant control signal distribution system, said control system comprising:
    a first control signal source co-located with a first set of control signal controlled circuit elements;
    at least one second control signal source co-located with a second set of control signal controlled circuit elements;
    a first controller; and
    at least one second controller; said first controller and second controller operable for substituting signals from said second control signal source for signals from said first control signal source if said signals from said first control signal source become unavailable to either said first or second circuit elements;
    wherein said first and second sets of circuit elements are interconnected by at least two transmission paths and wherein said controlling signals travel over both of said transmission paths.

2. The system of claim 1 wherein said control signal sources are system clocks.

3. The system of claim 1 wherein said first controller and at least one second controller enable said controlling signals to control both sets of controlled circuit elements even when one of said transmission paths is inoperative.

4. The system of claim 1 wherein said first controller and at least one second controller comprise a first multiplexer and a second multiplexer for accepting signals on their inputs from said first and second control signal sources, said first and second multiplexers operable for selecting which one of said control signals controls said controlled circuit elements.

5. The system of claim 4 wherein said first and second multiplexers have a preset hierarchical control among their respective inputs.

6. The system of claim 4 wherein said first multiplexer is co-located with said first set of controlled circuit elements.

7. The system of claim 6 wherein said second multiplexer is co-located with said second set of controlled circuit elements.

8. A distributed redundant control signal distribution system, said control system comprising:
    a first control signal source co-located with a first set of control signal controlled circuit elements;
    at least one second control signal source co-located with a second set of control signal controlled circuit elements;
    a first controller;
    at least one second controller: said first controller and second controller operable for substituting signals from said second control signal source for signals from said first control signal source if said signals from said first control signal source become unavailable to either said first or second circuit elements; and
    at least a third set of control signal controlled circuit elements wherein signals from said first control signal source control said third set of controlled circuit elements, said third set of controlled circuit elements having co-located therewith a controller for substituting signals from said second control signal source for said signals from said first signal control source if said signals from said first signal control source become unavailable.

9. The system of claim 8 wherein said last-mentioned controller comprises a multiplexer for accepting on its input a redundant set of control signals, said multiplexer operable for selecting which one of said redundant set of control signals controls said third set of controlled circuit elements.

10. The system of claim 9 wherein said at least one controller comprises a second multiplexer co-located with said first set of controlled circuit elements for accepting on its input said first and second control signals, said second multiplexer operable for selecting which one of the control signals control said first set of controlled circuit elements; and
    wherein said at least one controller further comprises a third multiplexer co-located with said second set of controlled circuit elements for accepting on its input said first and second control signals, said third multiplexer operable for selecting which one of said control signals controls said second set of controlled circuit elements.

11. A method for distributing control signals among a plurality of electronic boards, each electronic board having associated therewith control signal controlled circuitry, said method comprising;
    accepting, on each of said plurality of electronic boards, control signals originating from a first and second one of said electronic boards; and
    on each said first and second board hierarchically controlling said control signals such that either of said control signals originating from said first or from said second electronic boards are operative to control said controlled signal controlled circuitry on all of said electronic boards.

12. The method of claim 11 wherein said electronic boards are interconnected with redundant connections; and
wherein said hierarchically control signals are switched from a first to a second connection upon detection of a lack of a control signal on said first connection.

13. The method of claim 12 wherein said hierarchical control is operable for allowing said control signals originating from said first electronic board to dominate, followed by control signals originating from said second electronic board.

14. The method of claim 12 wherein on said second electronic board said hierarchy control allows signals originating on said first electronic board and provided to said second electronic board over a pair of transmission links to dominate over said control signals originating on said second electronic board.

15. A system for controlling clock signals for a plurality of electronic boards, said system comprising:
a clock source on at least two of said electronic boards;
at least one signal connection between all of said electronic boards, each said signal connection allowing clock signals to pass between said plurality of boards;
a controller on each of said boards, said controller operable for hierarchically selecting clock signals from at least one of said signal connections; and
wherein said signal controllers on said first and second electronic boards are further operable for hierarchically selecting one or the other of said clock sources.

16. The system of claim 15 wherein the hierarchy is such that said controllers only select the clock source from said second one of said boards when the clock source from said first one of said boards is not available.

17. The system of claim 16 wherein said controllers are multiplexers.

18. The system of claim 15 wherein said at least one signal connector is a plurality of independent transmission paths; and
wherein said controllers accept signals from each of said transmission paths for said hierarchical selection.

19. A method for protecting electronic circuits from dual clocking signal failures, said method comprising:
interconnecting said electronic circuits with dual independent clock signal transmission facilities;
providing to the input of a controller on each electronic circuit a clock signal generated local to said controller, the output of said controller supplying clock signals for circuitry local to said controller, said output further supplying clock signals as inputs to said dual independent transmission facilities;
providing to said input of said controller, clock signals from each of said signal transmission facilities; and
hierarchically selecting one of said inputs for presentation of the signals on said selected input to said output of said controller.

20. A distributed redundant control signal distribution system, said system comprising:
a first system node, comprising a control signal source, a controller, an input, an output and a first set of circuit elements requiring a control signal; and
a second system node, comprising a control signal source, a controller, an input, an output and a second set of circuit elements requiring a control signal;
wherein the output of the first node is coupled to the input of the second node;
wherein the output of the second node is coupled to the input of the first node; and
wherein the controller of the first node operates in tandem with the controller of the second node to alternatively select between the control signal sources of the first and second node to supply a control signal to the first set and second set of circuit elements.

21. The system of claim 20 wherein said control signal sources are system clocks.

22. The system of claim 20 further comprising:
a third system node, comprising a third controller, a third input and a third output;
wherein the second node is coupled to the first node through the third node;
wherein the second output is coupled to the third input;
wherein the third output is coupled to the first input; and
wherein the first, second and third controllers operate in tandem to select among the first and second control signal sources for supplying to the first set and second set of circuit elements.

23. The system of claim 22 wherein the third node further comprises:
a third set of circuit elements requiring a control signal;
wherein the third set of circuit elements requiring a control signal receives the same signal as both the first and second sets of circuit elements requiring a control signal.

24. The system of claim 22 wherein the third node further comprises:
a third control signal source;
wherein the first, second and third controllers operate in tandem to select among the first, second and third control signal sources for supplying to the sets of circuit elements requiring a control signal.

25. The system of claim 22 further comprising:
a fourth system node, comprising a fourth controller, a fourth input and a fourth output;
wherein the first node is coupled to the third node through the fourth node;
wherein the third output is coupled to the fourth input;
wherein the fourth output is coupled to the input of the first node; and
wherein the first second, third and fourth controllers operate in tandem to select among the first and second control signal sources for supplying to the sets of circuit elements requiring a control signal.

26. The system of claim 20 wherein the first controller and second controller each comprises a multiplexer for accepting multiple signals at the inputs of the multiplexer and selecting which one of the signals is passed to the output of the multiplexer.

27. The system of claim 26 wherein the multiplexer has a preset hierarchical control among its respective inputs.

* * * * *

UNITED STATES PATENT AND TRADEMARK OFFICE
CERTIFICATE OF CORRECTION

PATENT NO. : 7,230,468 B2 Page 1 of 1
APPLICATION NO. : 10/797776
DATED : June 12, 2007
INVENTOR(S) : Brad Underwood et al.

It is certified that error appears in the above-identified patent and that said Letters Patent is hereby corrected as shown below:

In column 4, line 24, in Claim 8, after "second controller" delete ":" and insert -- ; --, therefor.

In column 6, line 50, in Claim 25, after "first" insert -- , --.

Signed and Sealed this

Nineteenth Day of August, 2008

JON W. DUDAS
*Director of the United States Patent and Trademark Office*